United States Patent [19]

Carnes

[11] 4,024,573
[45] May 17, 1977

[54] SCANNING TV CAMERA

[76] Inventor: W. Robert Carnes, 32 Phillips Lane, Darien, Conn. 06820

[22] Filed: Apr. 19, 1976

[21] Appl. No.: 677,923

[52] U.S. Cl. .................................. 358/87; 358/108; 358/199; 358/206; 358/225

[51] Int. Cl.² ...................................... H04N 7/18

[58] Field of Search ........................... 352/106–119; 354/94; 350/6, 7; 178/7.92, 7.88, DIG. 38, 7.6; 358/206, 108, 199, 208, 225, 87

[56] References Cited

UNITED STATES PATENTS

| 3,780,224 | 12/1973 | Levine | 178/7.2 |
| 3,889,052 | 6/1975 | Back | 178/6 |

Primary Examiner—Robert L. Richardson
Assistant Examiner—Edward L. Coles
Attorney, Agent, or Firm—John K. Conant

[57] ABSTRACT

A TV camera is adapted to scan a field that may extend almost 360° around the camera, except for the angular area obscured by the camera body, by means of a double dove prism mounted for rotation in front of the camera lens on an axis that is normal to the optical axis of the lens. The double dove, which has an internal reflective surface, reflective on both sides, at the interface of the two dove portions, is oscillated by drive means to sweep continuously back and forth a selected angular amount less than 180° to cover a scan field of twice that angular amount, so that some portion of the scanned field is always in the field of view of the camera.

5 Claims, 6 Drawing Figures

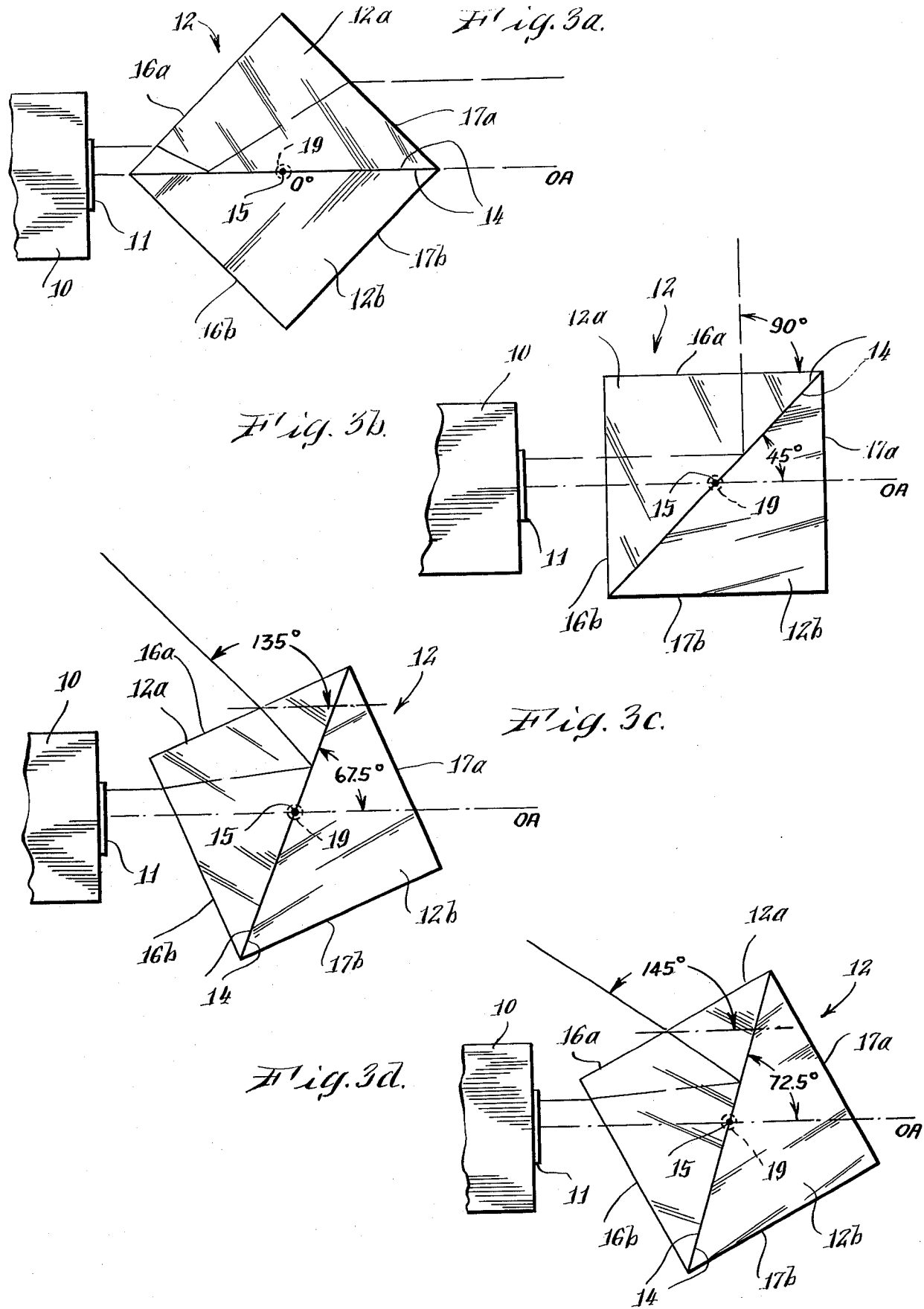

SCANNING TV CAMERA

BACKGROUND OF THE INVENTION

This invention is a scanning TV camera adapted for surveillance of a wide angular area. It is particularly suited for surveillance in places such as banks, stores, airport public areas, or any place which it is desired to have under surveillance by camera means; it permits viewing at location removed from the scene and provides an instantaneous picture that can be recorded in permanent or semi-permanent form; eg. on videotape, if desired for later reviewing, or for a permanent record.

Scanning photographic and TV cameras for the foregoing and other purposes are well known. However, such cameras presently known and used customarily scan by swinging the entire body of the camera, which necessitates rather bulky and expensive mounting structures and mechanisms for pivoting the cameras. Additionally it is sometimes desirable for the camera to be unobtrusive so as not to be readily noticed by a casual observer, but pivoting the whole camera draws attention to it; a moving body naturally attracts the eye and the larger the body the greater the attraction.

A principal object of the present invention is to provide a scanning TV camera that accomplishes the scanning by simple, economic, and relatively unobtrusive, yet effective, means.

The foregoing and other objects are realized by the scanning TV camera of this invention which accomplishes the scanning by moving only a portion of the camera system, the major portion suitably being mounted in fixed position. This not only has the advantage of a simpler and less expensive mechanism, but accomplishes the scanning with much less obtrusive motion than prior scanning camera systems which customarily swing the whole camera body. Moreover, with the system of this invention, when used for out-of-doors applications the camera housing may be mounted in fixed position thereby offering aerodynamically less resistance and minimizing the attendant twisting of electrical wiring going to the camera and to the scanning mechanism.

BRIEF SUMMARY OF THE INVENTION

In accordance with the invention the scanning by a TV camera is accomplished by oscillating a double dove prism in front of the camera lens. The prism is formed by two dove prisms cemented together base to base with the interface being made reflective on both sides. The double dove is oscillated about an axis in the plane of the interface on a line defined by the intersection, at the interface, of planes that are at right angles, respectively, to the refracting faces of the prism. The prism is mounted with its axis of rotation on, and substantially normal to, the optical axis of the camera lens.

Since light rays passing through a double dove prisms are reflected only once, the angle of scan is twice the angle of rotation. For example, rotating the double dove 45° scans an angular field of 90°. For scanning, the double dove is oscillated back and forth an angular amount that is one half the angular width of the desired field of scan, which can be 360°, less the angular area obscured by the body of the camera. The focal length and depth of field of the camera system is determined by the optical characteristics of the camera lens and of the dove.

While the use of a double dove in this manner produces certain optical distortions and aberrations, the uncorrected imagery is perfectly well suited for the usual surveillance purposes. Somewhat surprisingly, despite the distortions and aberrations caused by the double dove, the video pictures produced are not appreciably less clear or less accurate than pictures produced by the TV camera without the double dove in front of the camera lens.

PRIOR ART

Relevant prior art is in the field of panoramic cameras used for aerial photographic reconnaissance, as illustrated by U.S. Pat. No. 3,217,623 to R.N. Hotchkiss, which discloses a scanning camera wherein the scanning is performed by a double dove prism, with an internal reflective interface between the two dove portions, rotating continuously in one direction in front of the camera lens. In this type of system which uses photographic film, the film is drawn synchronously past the camera aperture as the double dove rotates. Since the double dove rotates 360°, there will be blanks along some portions of the film when the camera body itself is in the scanned field unless some stop motion mechanism is provided to stop the relative movement of the film at these times.

DESCRIPTION OF THE DRAWINGS

The invention is described in detail below with reference to the accompanying drawings in which:

FIGS. 3 a, b, c and d are top plan views of the double dove prisms of the system of FIGS. 1 and 2 showing the prism in a sequence of different angular positions and showing ray traces indicating the angular relation of incoming light relative to the optical axis of the system at the various positions of the double dove.

DETAILED DESCRIPTION

Figure 1:
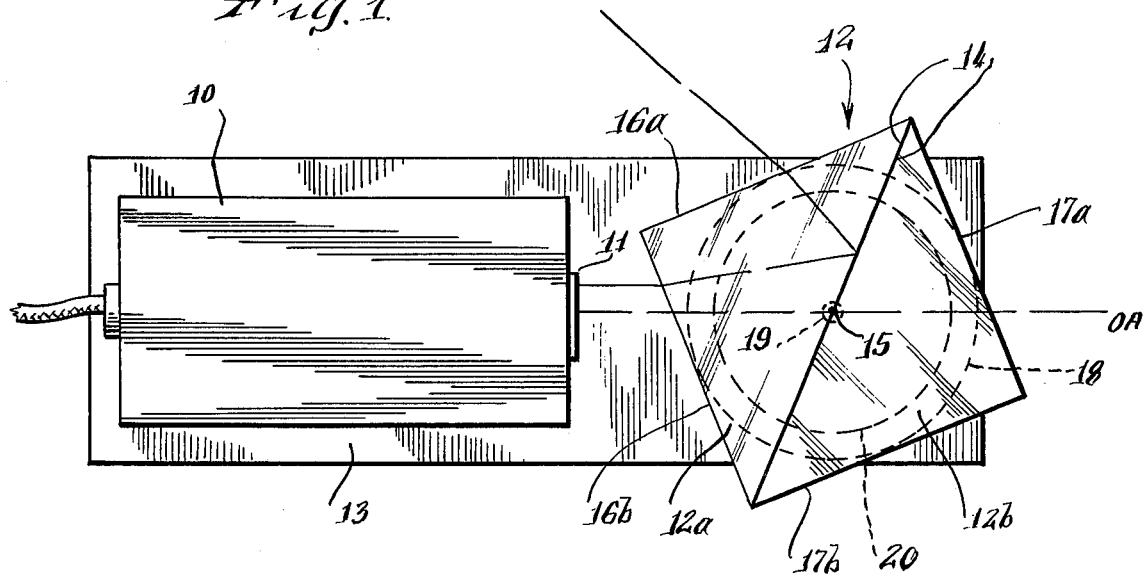
FIG. 1 is a top plan view of a TV scanning camera system embodying the invention.
Figure 2:
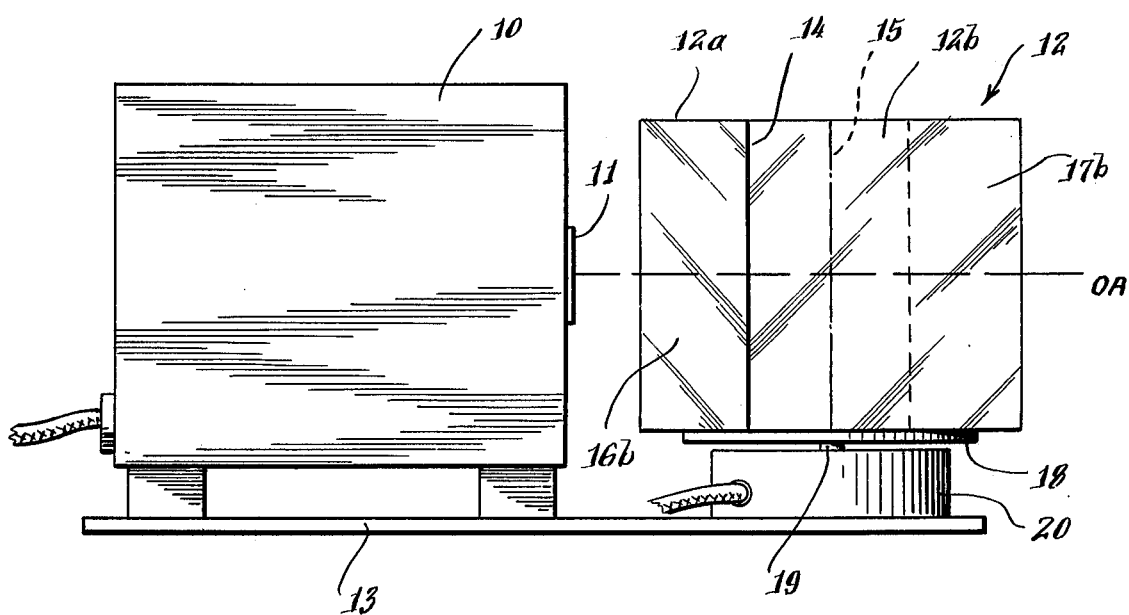
FIG. 2 is a side elevational view of the camera system of FIG. 1.

Referring to FIGS. 1 and 2, a scanning TV camera system of this invention is provided by a TV camera 10 having a lens 11 and a double dove prism 12 mounted in front of the lens. The camera 10 and the double dove 12 are both mounted in fixed relation of a base 13.

The double dove prism 12 is formed by two dove prisms, 12a and 12b, cemented together at their bases with a reflective surface 14 at the interface of the bases. The reflective surface 14 is reflective on both sides, extending over the entire interfacial surface, and is suitably formed by silvering the base of at least one of the doves before cementing them together.

The axis of rotation of the double dove 12, about which it is oscillated and which is indicated by a dot and dash line at 15 in FIG. 2, is in the plane of the reflective surface 14 on a line at which planes, that are at right angles to the faces 16a, 16b, 17a and 17b of the dove portions 12a and 12b, intersect. The double dove is mounted with its axis on, and substantially normal to, the optical axis OA of the lens 11.

The double dove is fixed on a support plate 18 and is mounted for oscillation about its axis by a shaft 19 attached to the support plate 19 at right angles thereto and extending down in coaxial alignment with the axis 15 of the double dove. Oscillatory motion is imparted to the double dove suitably by a reversing motor 20 mounted on the base 13 and drivingly connected to the shaft 19. Other drive means, such as a drive motor connected through links, or cams and links, to oscillate the shaft 19 could also be used, but a reversing motor with an adjustable rate of speed, and an adjustable degree of angular motion, provides a particularly simple and effective means for oscillating the double dove.

The size of the double dove in relation to the aperture of the lens 11 and the shape of the double dove (cube or rhombohedron, for example) are not critical. It is, however, desirable to have the double dove large enough in width and height to avoid vignetting of the image formed by the lens 11 in any angular position of the double dove. Normally, the double dove used will have a width and height larger by up to about two times, than the diameter of the lens aperture as measured at the optical projection of the lens aperture onto the surface of the double dove. Preferably the double dove 12 is a cube, as illustrated, for economy of manufacture as well as to provide the widest possible scan angle, limited only by the width of the body of the camera.

The spacing of the double dove 12 in front of the lens 11 also is not critical; it must be far enough in front to clear the lens as it oscillates, but beyond that the most pertinent considerations are the space to be taken up by the length of the system and the avoidance of vignetting by adhering to the relative size and spacing relationships mentioned above.

The oscillatory motion of the double dove 12 may be at any rate desired, within the rate at which the camera can produce a suitably recognizable picture at each increment of the scanning motion, and within the constraint of the normal flicker rate of a human observer's eye.

As illustrated in FIGS. 3a, b, c and d, the angle of scan of a double dove prism is twice the angle of rotation. These four Figures show by means of dash line ray traces the scan angles, relative to the optical axis OA, at the four angular positions of the double dove 12 shown in the respective Figures. The successive views illustrate the scanning path as the double dove 12 rotates counter clockwise from the zero angular position of FIG. 3a in which the reflective surface 14 is parallel to the optical axis OA, to the 72.5° angular position of FIG. 3d, in which the imaging light passes to the lens 11 through the dove portion 12a. Thereafter, when the double dove 12 oscillates in the clockwise direction and swings through the zero angular position of FIG. 3a, the scan path, as viewed in the drawings, is below the optical axis OA and the imaging light passes to the lens 11 through the dove portion 12b.

What is clamed is:
1. A scanning TV camera system comprising:
a TV camera having a lens and an optical axis of the lens;
a double dove prism having an internal surface that is reflective on both sides at the interface of two dove prisms joined together base to base to form the double dove and having four refracting faces relatively positioned as sides of a square;
said double dove prism having an axis of rotation in the plane of said interface on a line at which planes that are at right angles to said refracting faces intersect;
said double dove prism being mounted for rotation in front of said lens with its axis of rotation substantially normal to the optical axis of said lens; and
means for oscillating the double dove prism about its said axis a predetermined angular amount less than 180°, whereby a view of substantially 360° around the prism is obtained.
2. The camera system of claim 1 in which said oscillating means is a reversing motor drivingly connected to a shaft that is connected to said double dove prism coaxial with the axis of rotation of said prism.
3. The camera system of claim 1 in which said double dove prism is a square in cross section normal to its axis of rotation, and in which its width and height measured at said interface are each greater than the diameter of the aperture of said lens.
4. The camera system of claim 3 in which said width and height are larger than the diameter of said lens aperture as measured at an optical projection of said aperture on the surface of said double dove prism.
5. The camera system of claim 4 in which said double dove prism is a cube.

* * * * *